(No Model.) 3 Sheets—Sheet 1.
E. B. KEITH.
HAY COCKER.
No. 523,707. Patented July 31, 1894.
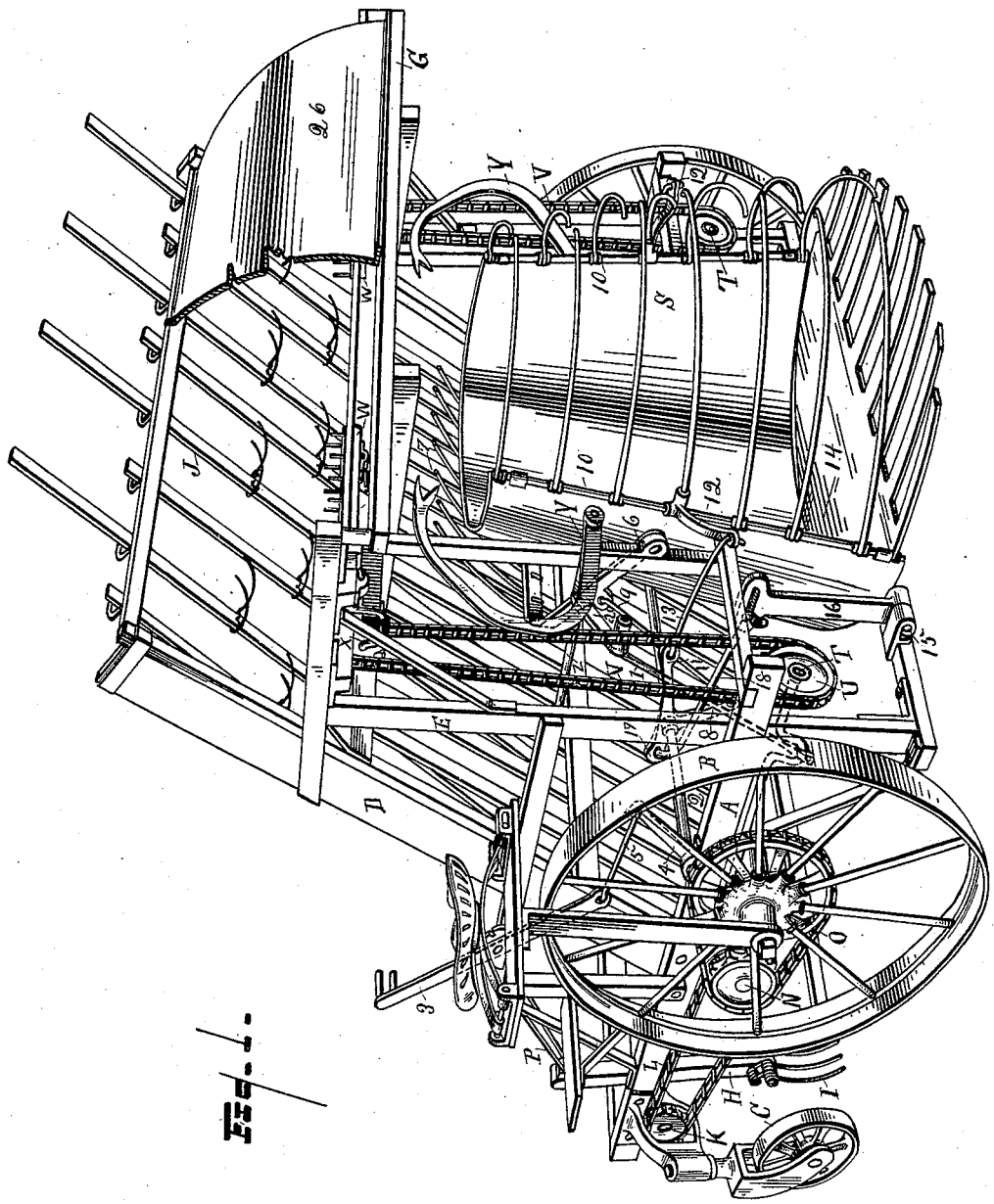
WITNESSES
INVENTOR
Ethan B Keith
By Lucius C West
atty.

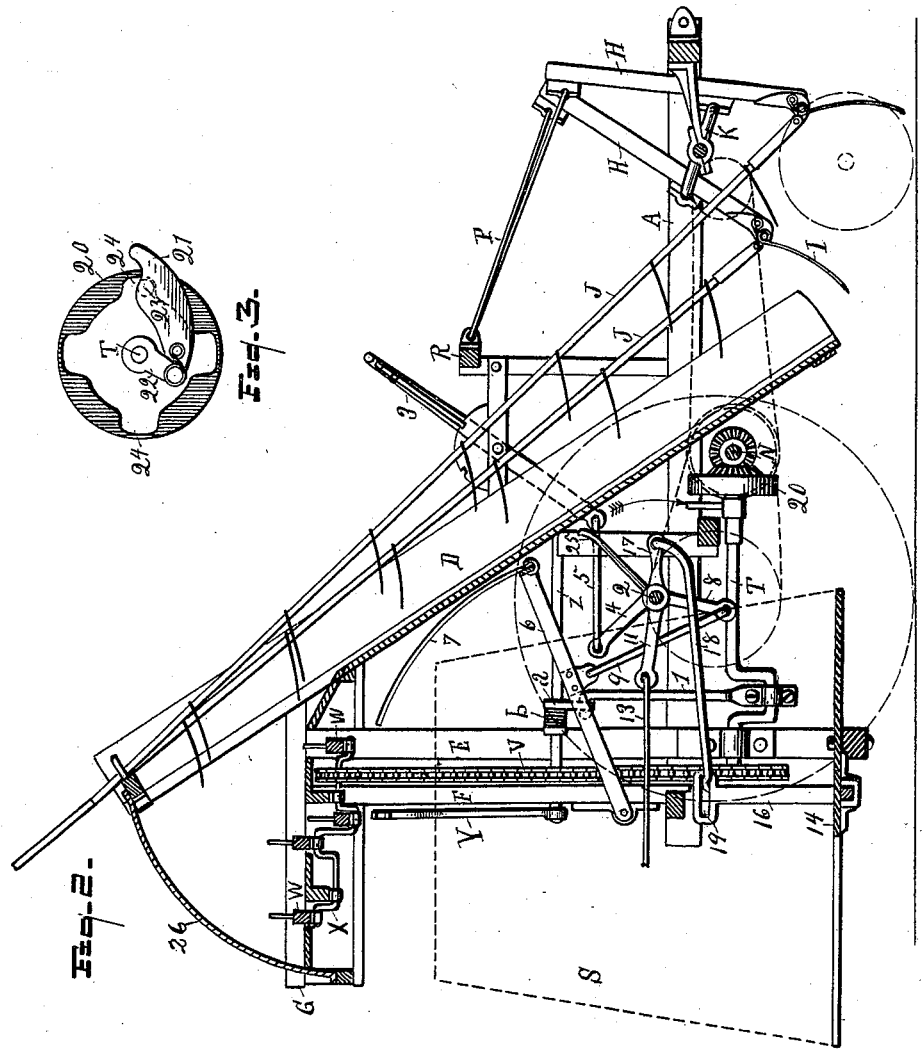

(No Model.) 3 Sheets—Sheet 3.
E. B. KEITH.
HAY COCKER.
No. 523,707. Patented July 31, 1894.
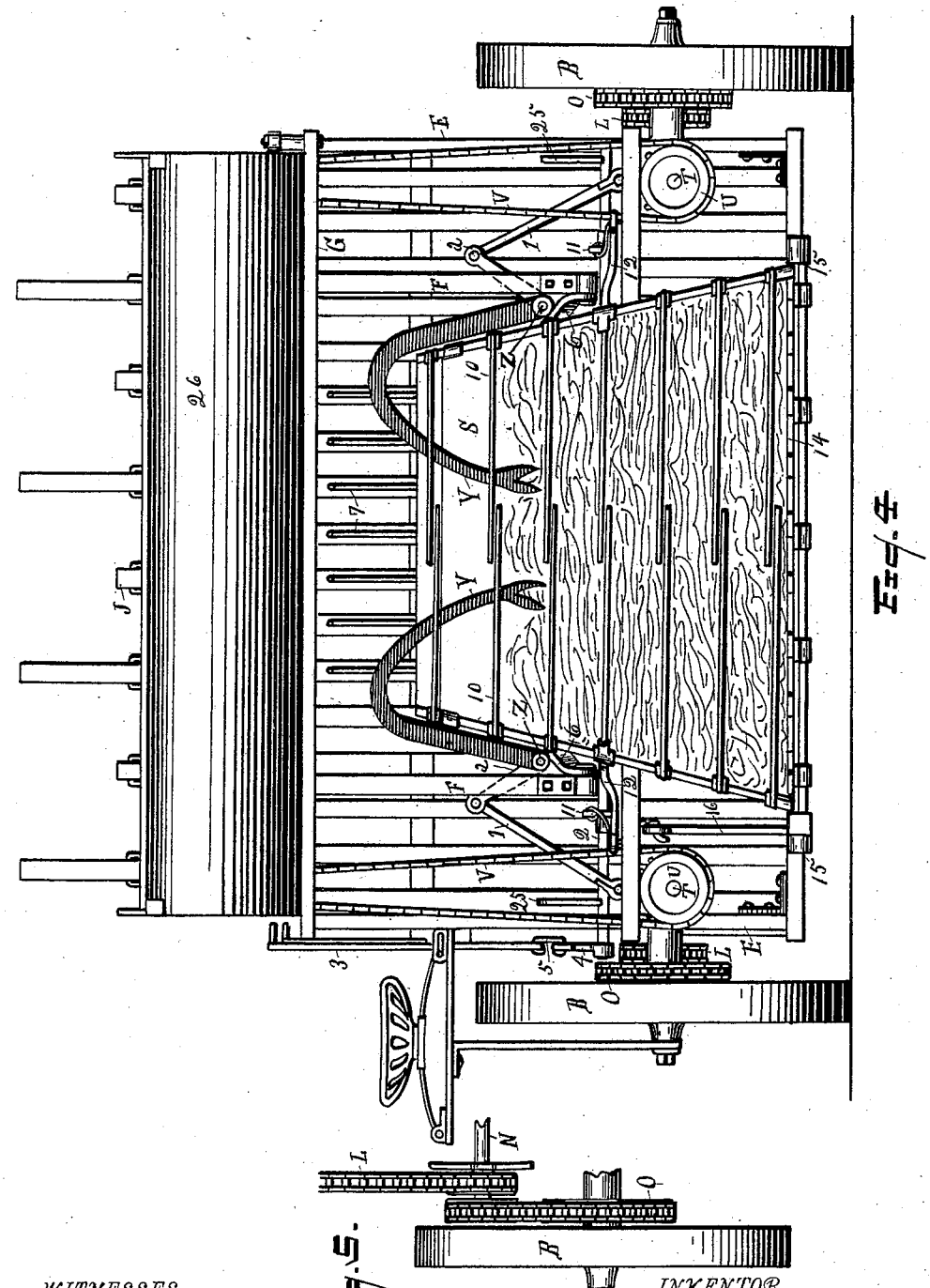
WITNESSES
J. E. Thomas
Levi F. Cox
INVENTOR
Ethan B Keith
By Lucius C West
Atty

UNITED STATES PATENT OFFICE.

ETHAN B. KEITH, OF GALESBURG, ASSIGNOR OF ONE-HALF TO WILLIAM R. RITTER, OF DOWAGIAC, MICHIGAN.

HAY-COCKER.

SPECIFICATION forming part of Letters Patent No. 523,707, dated July 31, 1894.

Application filed February 10, 1894. Serial No. 499,802. (No model.)

*To all whom it may concern:*

Be it known that I, ETHAN B. KEITH, a citizen of the United States, residing at Galesburg, county of Kalamazoo, State of Michigan, have invented a new and useful Hay-Cocker, of which the following is a specification.

My invention relates to hay cocking machines which employ rakes for gathering the hay, an elevator for elevating and delivering the hay into the forming receptacle beneath the upper end of the elevator; packers for packing the hay in the receptacle; side carriers for narrowing the swath of hay at the delivery end of the elevator, and a device for arresting the supply of hay while depositing the cock of hay on the ground.

The object of the invention is to facilitate the construction and operation of certain features of the machine, all as more fully described below.

A further object is, in providing the means for operating the packing forks and side carriers, to so construct and arrange them in relation to the hand lever and the means for operating the gate for arresting the supply of hay, and for operating the doors at the rear of the receptacle, that the same operation of the hand lever to swing the hay arresting gate and open and close said rear doors, also stops and starts the operation of the packing forks and side carriers.

In the drawings forming a part of this specification, Figure 1, is a perspective view of the machine looking against one of the rear corners. Fig. 2, is a vertical section of Fig. 4, looking from a point at the right; Fig. 3, enlarged details from Fig. 2; Fig. 4, a rear elevation, and Fig. 5, is a plan of details from Figs. 1, and 4.

Referring to the lettered parts of the drawings, A is a base frame supported by main wheels B, near the rear end, and swiveled caster wheels C, at the front corners.

The elevator-rack D, is attached to the base frame A, at the lower end, and is supported at an incline by uprights E, F, attached to, and extending above the base frame A, at the rear. These uprights E, F, support a frame or platform G, beneath the upper end of the elevator rack D. The gathering-rakes attached to the lower ends of short handles H, are shown at I, and to the lower end of the rake handles H, the lower end of the forked, alternately reciprocating elevator-bars J, are pivoted, and these are operated by a crank-shaft K, to which shaft the rake handles H, are pivotally attached between their two ends. To the upper end of the rake handles H, is pivotally attached one end of rods P, the other end of said rods being pivotally attached to a support R, above the frame A. This crank-shaft K, is driven by sprocket chains L, from the shaft N, and this shaft N, is driven by sprocket chains O, from the wheels B. By this means the hay is gathered, elevated, and deposited through the delivery opening in the center of the platform G, and down into the forming receptacle S, Fig. 1.

Any other suitable gathering-rakes, and elevating means may be employed so far as my invention is concerned.

On each side of the rear portion of the machine is a crank-shaft T, driven by the cross shaft N, which shafts T, and N, are connected with each other by bevel gears at the ends, Fig. 2. The rear ends of the crank shafts T, are provided with sprocket wheels U, which carry belts V.

Arranged in the platform G, at each side of the forming receptacle S, and above the same, are the hay-carriers, each consisting of a series of alternately reciprocating toothed-bars W, operated by double cranked shafts X, in a manner that some of the toothed bars move up and forward, while others move down and backward, thus alternating with each other, and carrying the hay which is delivered onto them, to the delivery opening, thus taking care of more hay in a given time than could be done if the elevator were only the width of the delivery opening. The double cranked shafts X of the carriers are driven by the sprocket belts V, Figs. 1, and 2.

The packing forks Y, are shaped like an arm bent at the elbow, so as to swing over the top edge of the forming receptacle S, and down into the same alternately as the hay falls in, said forks striking onto the hay endways thus firmly packing the same without whipping.

The packing forks Y, are rigidly attached to the revoluble shafts Z, on which shafts are loose levers a, which levers a, are attached to the shafts Z, by a tension spring b, so that when the levers a, operate to revolve the shaft Z, they first contract or coil the springs b, tighter. This gives a cushion effect to the packing forks in striking the hay. These levers a, are pivotally attached at the end to one end of connecting rods 1, Figs. 1, 2, and 4, and these connecting rods at the other end are attached to the cranks of the crank shafts T, and by this means the packing forks are operated.

Back of the forming receptacle S, and transversely to the machine is a revoluble shaft 2, which shaft is operated by a hand-lever 3, pivoted to the machine near the seat. The lower end of this hand-lever 3, is connected with the shaft 2, by an arm 4, projecting from said shaft at one end, and a link 5, jointedly attached at the ends to said arm and hand-lever.

A gate for closing the delivery opening over the forming receptacle S, while unloading said receptacle, consists of a bail like bar 6, pivoted at each end to the uprights F, of the frame, said bar 6, being provided with fingers 7, attached at the ends to its bowed portion, so that when said bar 6, is swung up the fingers 7, will project over the top of the forming receptacle S. This gate is connected with the shaft 2, by means of an arm 8, projecting from said shaft, and a link 9, jointedly attached at the ends to the arm 8, and the bar 6, Figs. 1, and 2. By this means the gate is operated by the hand lever 3.

The forming receptacle S, has two open-work doors 10 closing the rear half, Figs. 1, and 4. These doors 10, are hinged to the body of the receptacle S, at the sides. These doors are operated by the hand-lever 3, (at the same time the gate 6—7 is operated) by means of arms 11, projecting from the shaft 2, one on each side of the machine, arms 12, attached to the doors, and rods 13, jointedly attached at the ends to the arms 11, and to the doors 10.

The floor 14, of the receptacle S, is fulcrumed forward of its center of gravity, at 15, so that it will tilt down at the rear when depositing the cock of hay on the ground. This floor 14, is raised from its tilted position and held there while forming the hay cock, by the hand-lever 3, through the medium of an arm 16, projecting up from the fulcrum axis of the floor, an arm 17, projecting from the shaft 2, and a rod 18, jointedly attached at the ends to the ends of the arms 16, and 17, Figs. 1, and 2. The upper end of the arm 16, is provided with an elongated slot 19, Figs. 1, and 2, and the end of the rod 18, connects with this slot so as to play loosely therein, allowing the floor 14, to yield in going over uneven surfaces of the ground.

The hay carriers each side of the delivery opening, and the packing-forks Y, are both thrown out of gear, so as to remain at rest while depositing the hay cock on the ground, by the hand-lever 3, and at the same time said hand-lever closes the gate over the forming receptacle S, and opens the doors 10, and releases the floor 14. This is accomplished by employing a clutch device at the gear end of each of the crank-shafts T. The clutch shown in Figs. 2, and 3, consists of a shell 20, which is rigidly attached to the bevel gear at the end of the crank shafts T, said shell and gear being loose on said shafts. A spring actuated dog 21, is pivotally attached to a short arm 22, projecting from the crank shafts T. This dog 21, is provided with a projection 23, which, when the dog is thrown out by its spring, as in Fig. 3, engages one of the notches 24, of the shell 20, at which time the gear, and shell, and crank shafts T, are all revolved together by the revolution of the shaft N, and hence the packing-forks and the hay carriers are operated. Projecting from the shaft 2, are arms 25, Figs. 2, and 4, in position to bear down on the dogs 21, when the hand-lever 3, is thrown back to a position opposite to that shown in Fig. 2, which action disengages the dog 21, from the notch 24, thus throwing the crank shafts T, out of gear.

At 26, is shown a closure or guard located in the rear of the upper end of the elevator-bars J, to prevent the hay from falling over the rear of the machine.

In the operation referring to Figs. 1, and 2, all parts are in gear, and with the machine moving toward the left hand, and the packing-forks, and the hay carriers being of course in operation, the hay will be elevated and delivered into the forming receptacle S, until said receptacle is full. At this time the operator, by swinging the hand-lever 3, to the position opposite to that shown in Figs. 1, and 2, as stated, swings the gate over the mouth of the forming receptacle S, and throws the crank shafts T, out of gear, thus stopping for the time being the operation of the packing-forks and the hay carriers, and opens the doors 10, and releases the floor 14, of the forming receptacle, at which time the floor 14, tilts and is drawn from beneath the hay cock, leaving the same standing on the ground. During this very short lapse of time, the machine being still under motion, the hay was of course being elevated and accumulated on the gate and carriers. After depositing the hay cock on the ground as stated, the operator immediately reverses the hand-lever 3, and the doors of the forming receptacle S, are closed, the gate swung down opening the delivery opening, and the packing-forks and hay carriers set in motion, and the receptacle is again filled with hay, and so the operation continues.

Having thus described my invention, what I claim as new, and desire to secure by Letters Patent of the United States, is—

1. In a hay cocker, the combination of a suitable hay gatherer and elevator, a hay forming receptacle beneath the delivery end of the elevator, the lateral carriers each side of the delivery opening, crank shafts to which power is applied operatively connected with said carriers, a transverse shaft driven from the traction wheels of the machine, clutch gears connecting said shaft with the power crank shafts, and the rotatable shaft which is operated by the hand lever provided with the projections for operating the clutch gears, substantially as set forth.

2. In a hay cocker, the combination of a suitable hay gatherer and elevator, a hay forming receptacle beneath the delivery end of said elevator, packing forks adapted to pack the hay in said receptacle, a hay carrier each side of the delivery opening, the crank power shafts, operating means connecting the crank shafts with the packing forks and side carriers, a shaft transversely to the crank shafts, gears connecting the transverse shaft with the crank shafts, said gears having clutches with spring actuated dogs provided with the projecting ends, a hand lever, and a transverse shaft operated by said lever and provided with projections for contacting with the dogs of the clutches, substantially as set forth.

3. In a hay cocker, the combination of a suitable hay gatherer and elevator, a hay forming receptacle beneath the delivery end of the elevator, packing forks, side hay carriers, the crank power shafts, operating means connecting the crank shafts with the packing forks and side carriers, a shaft transversely to the crank shafts, gears connecting the transverse shaft with the crank shafts, said gears being provided with clutches, a hand lever, a transverse shaft operated by said hand lever and provided with projections for operating said clutches, the hay arresting gate, the hinged doors to the forming receptacle, and suitable means operatively connecting the hand lever shaft with the doors and gate, whereby the operation of the hand lever to operate the doors and gate, also stops and starts the side carriers and packing forks, substantially as set forth.

In testimony of the foregoing I have hereunto subscribed my name in the presence of two witnesses.

ETHAN B. KEITH.

Witnesses:
  LEVI F. COX,
  WILLIAM R. RITTER.